US010727762B2

(12) United States Patent
Aeloiza et al.

(10) Patent No.: US 10,727,762 B2
(45) Date of Patent: Jul. 28, 2020

(54) MODULAR, MULTI-CHANNEL, INTERLEAVED POWER CONVERTERS

(71) Applicant: ABB Inc., Raleigh, NC (US)

(72) Inventors: Eddy Aeloiza, Apex, NC (US);
Rolando Burgos, Blacksburg, VA (US);
Yu Du, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/211,844

(22) Filed: Jul. 15, 2016

(65) Prior Publication Data

US 2016/0329832 A1 Nov. 10, 2016

Related U.S. Application Data

(63) Continuation of application No. PCT/US2014/065741, filed on Nov. 14, 2014.

(60) Provisional application No. 61/927,746, filed on Jan. 15, 2014.

(51) Int. Cl.
*H02M 7/68* (2006.01)
*H02M 1/14* (2006.01)
(Continued)

(52) U.S. Cl.
CPC .............. *H02M 7/68* (2013.01); *H02M 1/08* (2013.01); *H02M 1/12* (2013.01); *H02M 1/14* (2013.01);
(Continued)

(58) Field of Classification Search
CPC ............ H02M 1/08; H02M 1/12; H02M 1/14; H02M 1/42; H02M 7/493; H02M 7/68; H02M 7/81; H02M 7/487
(Continued)

(56) References Cited

U.S. PATENT DOCUMENTS

2005/0017699 A1* 1/2005 Stanley ..................... G05F 1/70
                                                      323/282
2011/0141786 A1* 6/2011 Shen ..................... H02M 7/487
                                                      363/131
(Continued)

FOREIGN PATENT DOCUMENTS

WO       2013105427         7/2013

OTHER PUBLICATIONS

Space Vector Modulator for Vienna-Type Rectifiers Based on the Equivalence Between Two- and Three-Level Converters: A Carrier-Based Implementation, IEEE Transactions on Power Electronics, vol. 23, No. 4, Jul. 2008.*

(Continued)

*Primary Examiner* — Thienvu V Tran
*Assistant Examiner* — Lorena D Bruner
(74) *Attorney, Agent, or Firm* — J. Bruce Schelkopf; Taft Stettinius & Hollister LLP

(57) ABSTRACT

A multi-phase power converter includes two or more multi-phase, bi-directional, multi-level, switching power converter subcircuits, connected in parallel at respective AC and DC sides, so as to provide a multi-channel, bi-directional, multi-level configuration. The AC sides of the switching converter subcircuits are directly coupled to one another and to a multi-phase AC input via series interface reactors, and the DC sides of the switching converter subcircuits are directly connected to one another and to a common split-capacitor bank at each level of the multi-level outputs of the switching converter subcircuits. A control circuit is configured to selectively control one or more switching semiconductor devices in each of the switching converter subcircuits. In some embodiments, the control circuit includes a closed-loop zero-sequence controller and a zero-sequence generator configured to eliminate circulating current among the switching converter subcircuits and to balance voltages across levels of the common split-capacitor bank.

15 Claims, 10 Drawing Sheets

(51) Int. Cl.
   *H02M 7/493*   (2007.01)
   *H02M 7/81*    (2006.01)
   *H02M 1/08*    (2006.01)
   *H02M 1/12*    (2006.01)
   *H02M 1/42*    (2007.01)
   *H02M 7/487*   (2007.01)

(52) U.S. Cl.
   CPC ............. *H02M 1/42* (2013.01); *H02M 7/493* (2013.01); *H02M 7/81* (2013.01); *H02M 7/487* (2013.01)

(58) Field of Classification Search
   USPC ........................................................ 323/207
   See application file for complete search history.

(56) References Cited

U.S. PATENT DOCUMENTS

| 2011/0176340 | A1* | 7/2011 | Sakakibara | H02M 5/297 363/34 |
| 2013/0215654 | A1  | 8/2013 | Yan et al. | |
| 2013/0229836 | A1  | 9/2013 | Wang et al. | |
| 2014/0210271 | A1* | 7/2014 | Toyoda | H02J 3/46 307/66 |
| 2015/0002066 | A1* | 1/2015 | Oda | H02M 5/4585 318/500 |
| 2015/0021983 | A1* | 1/2015 | Karimi | B60R 16/033 307/9.1 |

OTHER PUBLICATIONS

Burgos R. et al., "Space Vector Modulator for Vienna-Type Rectifiers Based on the Equivalence Between Two and Three Level COnverters: A Carrier Based Implementation", IEEE Transactions on Power Electronics, Institute of Electrical and Electronics Engineers, vol. 23, No. 4 pp. 1888-1898 Jul. 1, 2008.

Search Report and Written Opinion, PCT Appln. No. PCT/US2014/065741, 11 pgs. Feb. 12, 2015.

* cited by examiner

MODULAR, MULTI-CHANNEL, INTERLEAVED POWER CONVERTERS

U.S. GOVERNMENT RIGHTS

This invention was made with Government support under ARPA-E Cooperative Agreement DE-AR0000141 awarded by the Department of Energy (DOE). The Government has certain rights in this invention.

TECHNICAL FIELD

The present disclosure relates to power converters for use in electric distribution systems.

BACKGROUND

In the electric power industry, direct-current (DC) distribution systems, DC energy sources such as photovoltaic (PV) panels and fuel cells, and DC-based energy storage systems are of increasing interest. In particular, considerable research is directed to the development of practical energy storage systems based on the use of batteries, superconductive energy storage systems, flow batteries, super-capacitors, and the like.

Frequently, a DC energy source or DC loads need to be connected to an alternating-current (AC) grid, AC source, or AC load. This is conventionally done with a grid-tie converter that converts AC into DC and/or vice-versa. Hereinafter, such a converter is referred to as an AC-DC converter or, more simply, a power converter, even in the event that the converter allows for bidirectional power flow. Thus, the term AC-DC converter as used herein should not be understood to be limited to converters in which the power flow is exclusively from the AC side to the DC side. In some cases, the power flow is only one way, e.g., in the case of a solar panel system supplying energy to an AC grid. In other cases, however, such as with the energy storage systems mentioned above, the grid-tie converter must handle power flow in both directions, e.g., supporting power flow from the AC side to the DC side while charging a battery-based system, and in the reverse direction when drawing energy from the batteries.

Accordingly, AC-DC converters that can handle bi-directional power flow and that have high-efficiency, low distortion, and improved cost and size are needed.

SUMMARY

Embodiments of the present invention include a voltage-source, multi-level, multi-channel, interleaved power converter that can be used as an active rectifier or as an inverter. The multilevel structure enables the converter to reach higher voltage levels, while the interleaving approach allows the converter to handle higher current levels with significant reductions in the size and weight of passive components, such as the AC linkage reactors and AC filter, as well as reductions in DC-bus capacitor current ripple. In some embodiments, the converter structure has a modular architecture, where each converter subcircuit can be switched at switching frequencies that would comfortably ensure low total switching losses.

An example multi-phase power converter includes two or more multi-phase, bi-directional, multi-level, switching power converter subcircuits connected in parallel at respective AC and DC sides, so as to provide a multi-channel, bi-directional, multi-level configuration. The AC sides of the switching converter subcircuits are directly coupled to one another and to a multi-phase AC input via series interface reactors, and the DC sides of the switching converter subcircuits are directly connected to one another and to a common split-capacitor bank at each level of the multi-level outputs of the switching converter subcircuits. A control circuit is configured to selectively control one or more switching semiconductor devices in each of the switching converter subcircuits.

In some embodiments, the control circuit includes a closed-loop zero-sequence component controller configured to substantially eliminate circulating current among the switching converter subcircuits by maintaining the average of zero-sequence current component, Iz, near zero and an additional zero-sequence duty cycle generator (alternatively referred to as a common-mode injector) configured to realize Space Vector Modulation equivalence and to balance voltages across levels of the common split-capacitor bank.

In some embodiments, the control circuit is configured to control the switching semiconductor devices so that corresponding switching semiconductors in each of the switching converter subcircuits are switched in an interleaved manner. In some of these and in some other embodiments, the series interface reactors comprise multi-phase-coupled inductors.

In some embodiments, the switching converter subcircuits each comprise a neutral-point-clamped, multi-level, power converter circuit. In other embodiments, each of the switching converter subcircuits comprises a multi-level, flying capacitor, power converter circuit.

Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

The term "directly coupled" is used in the present disclosure to refer to two nodes or elements that are electrically coupled to one another in such a way that a DC current may pass from one node or element to the other. Thus, two nodes may be directly coupled to one another through a resistive or inductive element. In contrast, the term "directly connected" is used to refer to two nodes or elements that are electrically connected to one another without any intervening resistive, inductive, or capacitive elements, except for the inherent resistance of the connecting wires, traces, or the like.

Embodiments of the present invention include a multi-channel, multi-level, interleaved, voltage-source power converter that can be used as an active rectifier or as an inverter. The multilevel structure enables the converter to reach higher voltage levels, while the interleaving approach allows the converter to handle higher current levels with significant reductions in the size and weight of passive components, such as the AC linkage reactors and AC filter, as well as reductions in DC-bus capacitor current ripple. In some embodiments, the converter structure has a modular architecture, where each converter subcircuit can be operated at low switching frequencies that can comfortably ensure low total switching losses.

The reduction of the reactors' inductances enabled by the presently disclosed converter circuits will allow a reduction in copper losses, compared with traditional approaches where larger reactors are needed. The reduction in DC-bus capacitor currents will allow lower capacitor heat dissipation, extending the lifetime of the capacitors. Moreover, the interleaving approach will also provide a significantly higher effective carrier frequency, increasing the converter bandwidth and lowering total harmonic distortion.

Figure 1:
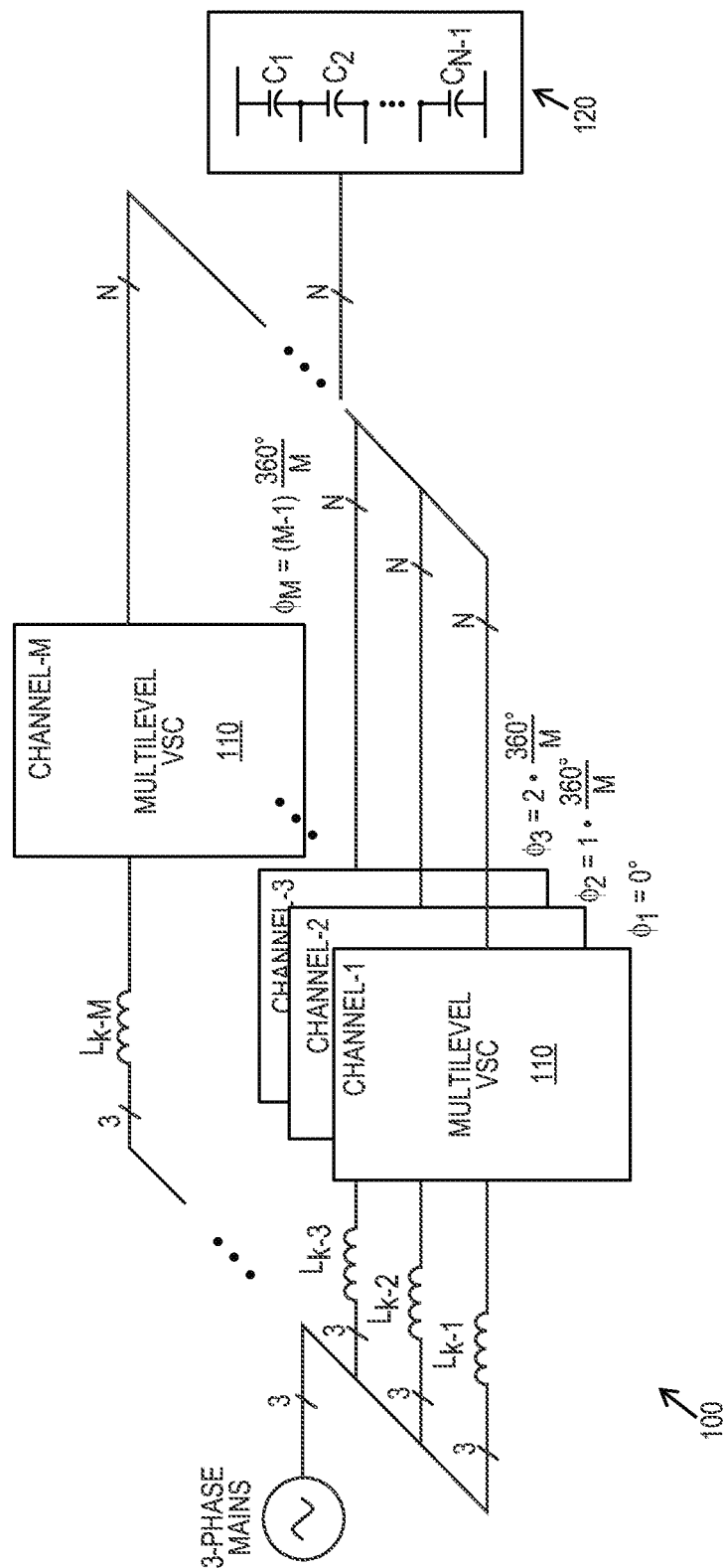
FIG. 1 is a schematic diagram illustrating an example multi-phase, multi-channel power converter according to some embodiments of the present invention.

FIG. 1 illustrates a portion of a three-phase embodiment of a multi-channel, multilevel interleaved, bi-directional, voltage-source converter 100 according to embodiments of the present invention. The illustrated structure comprises multiple multi-phase, bi-directional, multilevel, voltage-source AC-DC converter subcircuits 110, connected in parallel so as to provide a multi-channel, bi-directional, multi-level configuration. The converter subcircuits 110 are directly coupled to one another and to a three-phase AC interface through series interface reactors (Lk). The DC sides of the switching converter subcircuits are directly connected to one another and to a common split-capacitor bank 120 at each of the N multi-level outputs of the switching converter subcircuits. It will be appreciated that the architecture of the circuit shown in FIG. 1 lends itself to a modular implementation—thus, in some embodiments, each of the switching converter subcircuits 110 is included in a separate, self-contained module.

Also included in embodiments of the present invention but not shown in FIG. 1 is a control circuit configured to selectively control one or more switching semiconductor devices in each of the switching converter subcircuits 110. The control circuit in some embodiments is configured to control the switching semiconductor devices so that corresponding switching semiconductors in each of the switching converter subcircuits are switched in an interleaved manner, e.g., in that the gate control signals for each subcircuit are phase-shifted, relative to the corresponding gate control signals in the other subcircuits. While this is not essential, controlling the subcircuits in an interleaved fashion allows for improved performance, e.g., with respect to total harmonic distortion. The use of interleaved control is shown in FIG. 1, which indicates that the pulse-width-modulated control signals of each converter subcircuit 110 are shifted in phase from its neighbor by a phase angle of 360°/M, where M is the number of converter subcircuits, i.e., the number of channels. If M=3, for example, then the switching carrier and the control signals for each channel are shifted by 120° relative to the channel's neighbors.

As suggested by FIG. 1, embodiments of the presently disclosed AC-DC converter circuit may include an arbitrary number of multi-level converter subcircuits in parallel, with the subcircuits each providing an arbitrary number of levels. It should be appreciated that the term "multi-level converter" is a term of art that indicates that a voltage output is synthesized or an input voltage is sourced from three or more levels of DC capacitor voltages. Thus, a conventional two-level converter is not a "multi-level converter" as that term is used herein. Bi-directional, multi-level converter topologies of several types are known and may be employed in each of the converter subcircuits shown in FIG. 1—examples include the neutral-point-clamped (NPC) and flying capacitor types of converters.

The interface reactors can be constructed as single-phase units or multiphase-coupled inductors, conventional 3-phase reactors, or a combination of 3-phase reactors and common mode 3-phase reactors. Importantly, the multiple multi-level converter subcircuits are connected at the AC side through reactors, without the use of isolation transformers. Likewise, the DC sides of all channels are directly connected to one another and to the common split-capacitor bank. As discussed in further detail below, this approach provides advantages with respect to size, cost, and efficiency. While omitting isolation transformers on the AC side creates the potential for circulating currents among the subcircuits, these circulating currents can be controlled using the controller circuits and techniques described in further detail below. These control circuits include controllers configured to control the active and reactive power flow of each of the switching converter subcircuits using d-axis and q-axis reference voltages, respectively, of a synchronous reference frame of a reference frequency, and further include a closed-loop zero-sequence component controller circuit configured to eliminate circulating current among the switching converter subcircuits and a zero-sequence duty cycle generator to realize the Space Vector Modulation equivalence and to balance voltages across levels of the common split-capacitor bank.

As noted above, each multilevel converter subcircuit can comprise any of several types of bidirectional, multi-level AC-DC converter circuits, such as a diode neutral-point-clamped topology or flying capacitor type converter. These converter circuits permit bidirectional power flow and can be built with semiconductor switches selected according to the voltage- and current-handling requirements for each subcircuit. The parallel connection of the subcircuits is done by interconnecting the AC side of each subcircuit through the interface reactors, and by directly connecting the subcircuits to one another at each level of the multi-level DC interfaces of the subcircuits. For instance, the DC side interconnection is done by tying the positive electrical points from each subcircuit to the positive pole of a common split capacitor bank, the negative electrical points from each subcircuit to the negative pole of the split capacitor bank, and connecting all the corresponding intermediate levels to intermediate nodes of the split capacitor bank. Thus, N connection points at the DC bus will be necessary, where N is greater than two and corresponds to the number of voltage levels of each multilevel converter subcircuit.

An interleaving control mode is utilized such that the corresponding gating signals for each subcircuit have a phase shift angle $\phi$ equal to 360°/M relative to one another, where M is the number of subcircuits. This is done, for example, by using a set of triangle carriers to create gate control signals for controlling switching devices in each converter subcircuits, where the corresponding triangle carriers for each subcircuit are delayed with respect to one another by the phase shift angle $\phi$. The interleaving of each multi-level converter subcircuit allows support for higher current levels, allows the weight and volume of the input reactors to be decreased, and increases the bandwidth of the overall system. In addition, smaller AC filters can be employed, while still complying with current harmonic and electromagnetic interference standards.

Reductions in input reactor weight and volume are obtained due to the fact that the interleaving approach will enable significant cancellation of the AC overall current ripple with a smaller inductance per channel. Even though a higher AC current ripple is allowed per channel, the overall ripple is reduced, compared with a single converter or with a multi-channel converter that does not use interleaving, when using equivalent reactors. Moreover, the fact that multilevel subcircuits are connected in parallel allows for further reduction of the linkage inductance, since the instantaneous voltage drops across the inductors, which result from the difference between the converter and grid voltage, will be smaller, due to the higher number of voltage levels in the multi-level converters.

Figure 2:
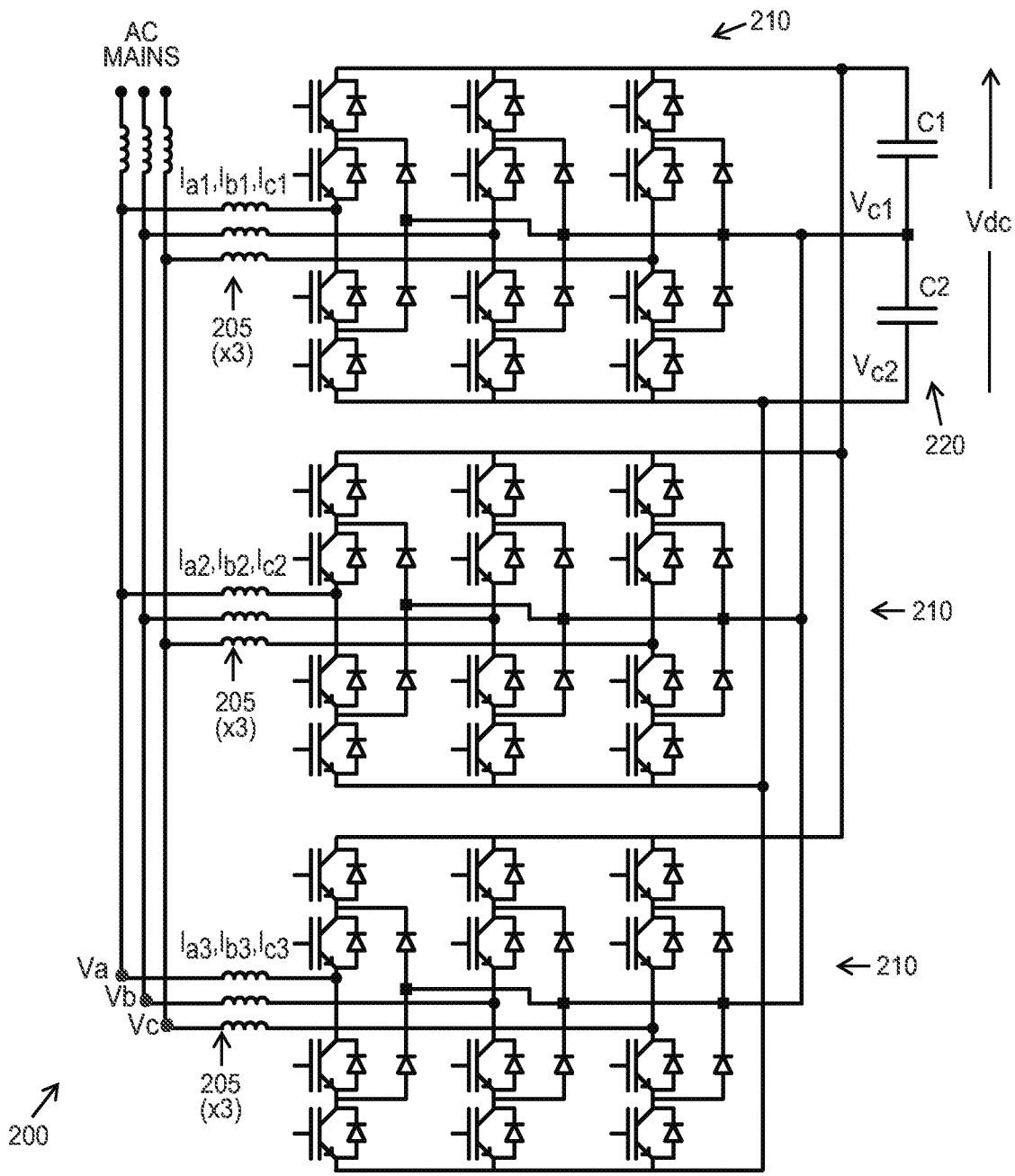
FIG. 2 is a schematic diagram illustrating details of an example three-phase, three-channel, and three-level power converter.

FIG. 2 provides a more detailed example of a multi-phase, multi-channel, AC-DC power converter 200 according to embodiments of the present invention. In this example, three three-level, diode neutral-point-clamped (NPC), voltage-source converter subcircuits 210 are connected in parallel. The DC sides of the subcircuits 210 are directly connected to one another and to the common split capacitor bank 220, and the AC sides of the subcircuits 210 are directly coupled to one another and to a three-phase AC input through series reactors 205. Note that the DC neutral points are interconnected and connected to the middle point of the capacitor bank 220, which consists of capacitors C1 and C2. The DC-side voltage Vdc spans the capacitor bank 220.

Not shown in FIG. 2 is a control circuit that uses a synchronous reference frame control scheme to control the DC-bus voltage Vdc and the active and reactive power flows through the pictured converter 200. As will be discussed in further detail below, a control loop is used to balance the voltages across the DC-bus capacitors C1 and C2, and an additional control loop is used to eliminate the average zero-sequence current or circulating current among the subcircuits 210.

When a voltage-source converter is connected to an AC grid, a linkage reactor must be used to control the current between the two voltage sources. The value of the reactor's inductance will depend on the power to be transferred, but will also depend upon the ability of the converter to provide a voltage waveform close to a sine wave, and the number of voltage levels the converter supports. The converter's ability to provide a voltage waveform that closely mimics a sine wave is in turn related to the converter's switching frequency. The higher the switching frequency, the lower the reactor's inductance; thus, a high switching frequency is always desired. Similarly, the higher the number of voltage levels, the lower the value of the linkage reactor.

For high-power converters, increasing the switching frequency can become impractical, since semiconductor switching losses will significantly increase. While, the use of a multi-level structure will reduce the linkage reactance, as compared with a 2-level approach, the required linkage reactance can be reduced even further if the multiple multi-level subcircuits are operated in an interleaved manner. By interleaving the control of M converter subcircuits, the effective or equivalent switching frequency at the AC side is increased by M times the switching frequency of one subcircuit. The overall current ripple generated at the AC side will be significantly reduced, due to the phase shift between the ripple components for the multiple subcircuits. Since a significant portion of the current ripple at the AC common point of connection is expected to be cancelled, it is possible to reduce the size of the AC linkage reactors for each subcircuit and allow local higher current ripple. This strategy will allow for reduction of overall weight and volume on reactors as compared with the case where parallel modules are used without carrier interleaving or when only one converter and one set of reactors are used.

Figure 3:
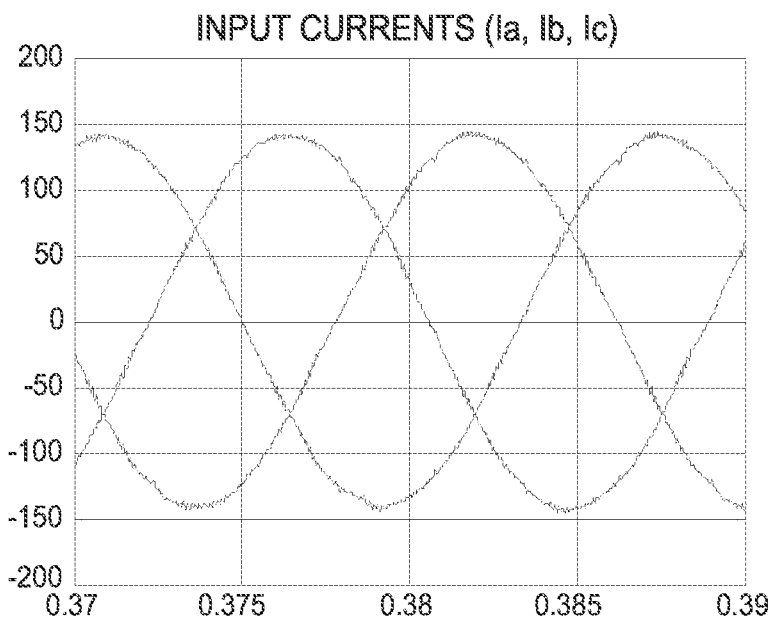
FIG. 3 illustrates input AC current for an example multi-channel power converter, with interleaving.
Figure 4:
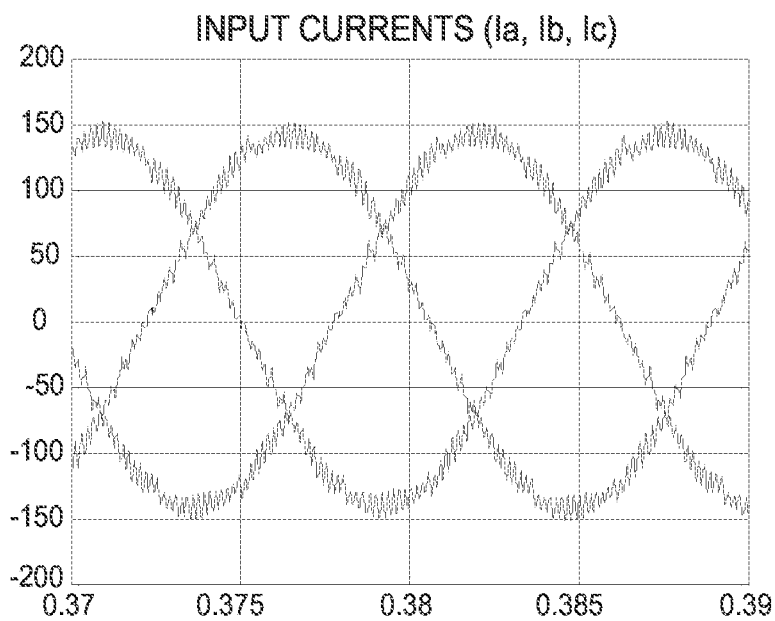
FIG. 4 illustrates input AC current for an example multi-channel power converter, without interleaving.

FIG. 3 shows an example of the overall input currents when interleaving three 3-level channels with an equivalent reactor of 5% of the converter's base impedance. The total harmonic distortion (THD) is remarkably low, e.g., about 1.574%, without the use of an AC filter. FIG. 4, on the other hand, shows the same structure, using the same AC reactors without using interleaving. In this case, the THD is 5.67%. Note that here the THD is calculated considering the high frequency spectrum, in order to have a method of comparison.

Interleaving the carriers used to control the converter subcircuits yields additional advantages at the DC side of the power converter, where the DC sides of the subcircuits are directly connected to one another and to a split capacitor bank. The DC-bus capacitor root-mean-square (RMS) current can be significantly reduced as a result of the interleaving, which will reduce capacitor heat and the concomitant need for cooling mechanisms, resulting in potentially increased power density, or reduce the temperature rise and extend the capacitor lifetime. For instance, the RMS value of the current on one DC-bus capacitor for an example three-level converter is reduced to less than half when three three-level converters are interleaved and switched at the same switching frequency. In addition, the main characteristic current frequency components across the DC capacitors will be shifted to multiples of the number of interleaving channels M.

Figure 5:
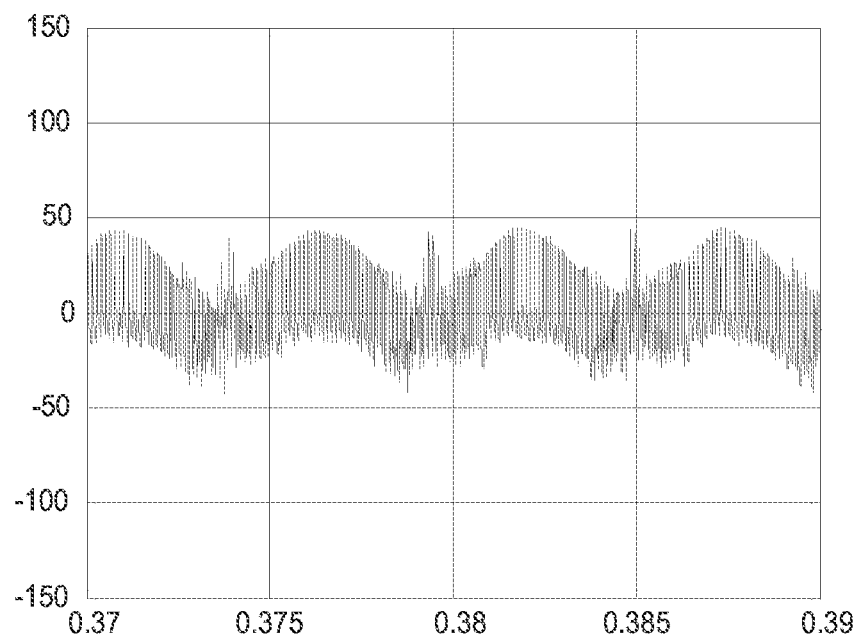
FIG. 5 illustrates DC bus capacitor current for an example multi-channel power converter, with interleaving.
Figure 6:
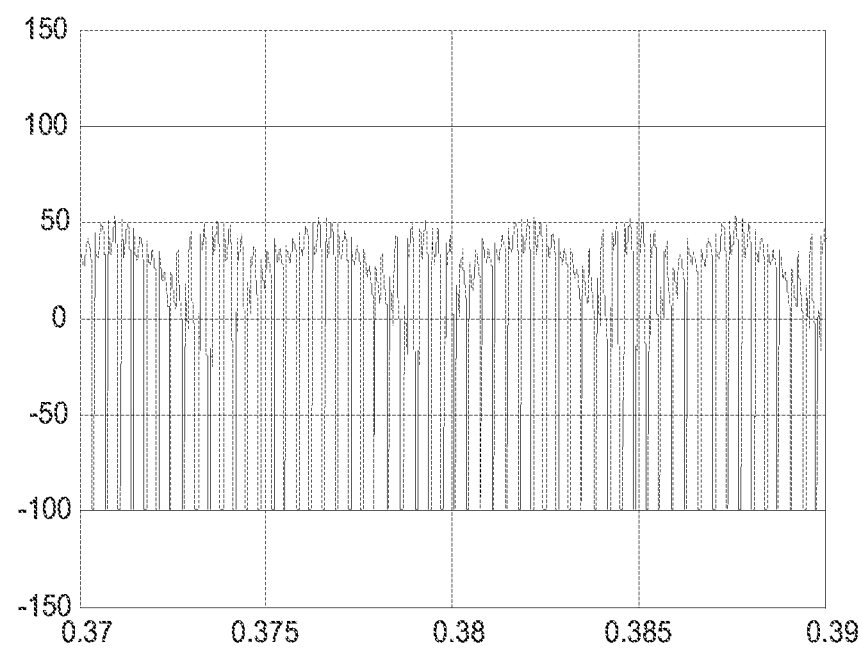
FIG. 6 illustrates DC bus capacitor current for an example multi-channel power converter, without interleaving.
Figure 7:
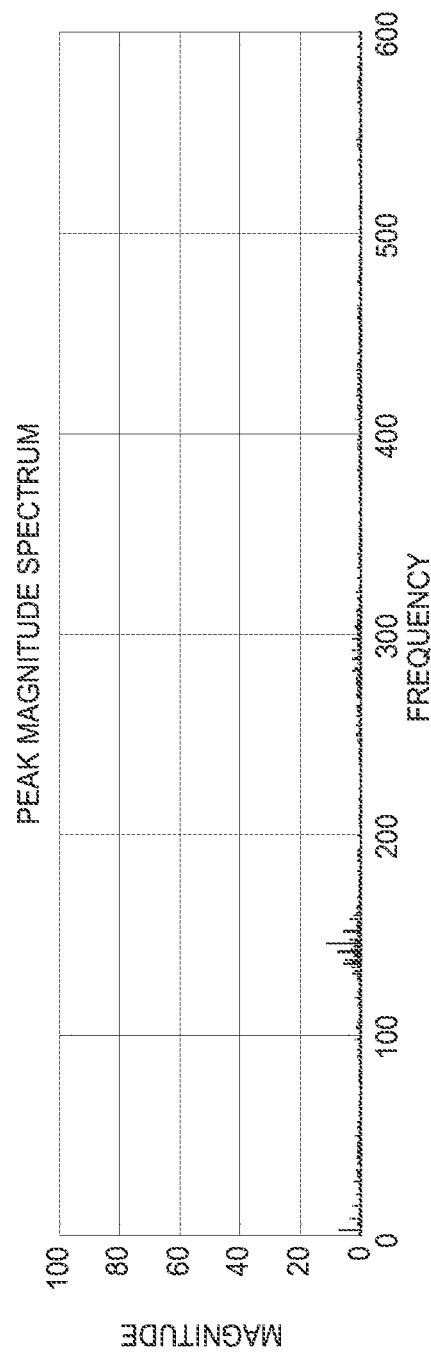
FIG. 7 illustrates the harmonic spectrum of one DC bus capacitor current for an example multi-channel power converter, with interleaving.
Figure 8:
FIG. 8 illustrates the harmonic spectrum of one DC bus capacitor current for an example multi-channel power converter, without interleaving.

FIGS. 5 and 6 each show the current across one capacitor of a split capacitor bank when three three-level NPC channels (e.g., as shown in FIG. 2), where FIG. 5 shows the case with interleaving and FIG. 6 shows the case without interleaving. The RMS current is significantly reduced with interleaving. Further, the harmonic spectrum is more benign for capacitors' life and heat management. FIGS. 7 and 8 show the harmonic spectrum of the current across one capacitor with and without interleaving, respectively.

As shown above, the parallel interleaved converter structures disclosed herein can be designed to operate with high efficiency and with low AC-side and DC-side ripple, while allowing the reactors' sizes and cooling efforts to be reduced. In addition, the use of multiple converters connected in parallel will enable reaching higher current levels and, of course higher power. The circuit also has a modular structure, which facilitates the development, deployment, and maintenance of the subcircuits in self-contained modules, providing additional flexibility in system design and potentially reducing deployment and maintenance costs.

However, the structures disclosed herein also feature some implementation challenges. For instance, one shortcoming of paralleling active rectifiers or inverters is the generation of unwanted circulating current (or cross-currents) among the converters. Two types of currents are observed: a low frequency circulating current and a high-frequency current. To mitigate the circulating currents, an isolation transformer can be used for each converter subcircuit (or for all of the converter subcircuits but one). However, this makes the approach bulkier and more expensive. Another possible solution is to use separate DC links. However this solution is obviously unviable if only a single DC output is desired.

In embodiments of the present invention, the low frequency circulating current is suppressed by adding a closed-loop zero-sequence controller to all of the multilevel converter subcircuits except one (i.e., to M–1 of the subcircuits). These closed-loop zero-sequence controllers maintain the average circulating current close to zero. The high-frequency circulating current can be limited by the AC reactors and by the addition of common mode chokes on the AC side, which are commonly used to reduce common mode noise. The cross-currents can also be reduced by using coupled inductors. However, the use of coupled inductors is not necessary for the proper operation of this approach.

In addition to the circulating current challenge, there is another issue that needs to be addressed when using NPC converters. It is known that NPC converters have an inherent problem with a possible imbalance of the capacitor voltages in the split capacitor bank. This can result in overvoltage of one or more of the converter switches. An imbalance means that the split capacitors might be charged unequally, and can also result in possible deterioration of the input current quality. In order to resolve this issue, several approaches have been proposed for a single NPC converter. With the control circuits described herein, however, voltage balancing can be managed for multiple units connected in parallel while also addressing the issue for bidirectional power flow.

Figure 9:
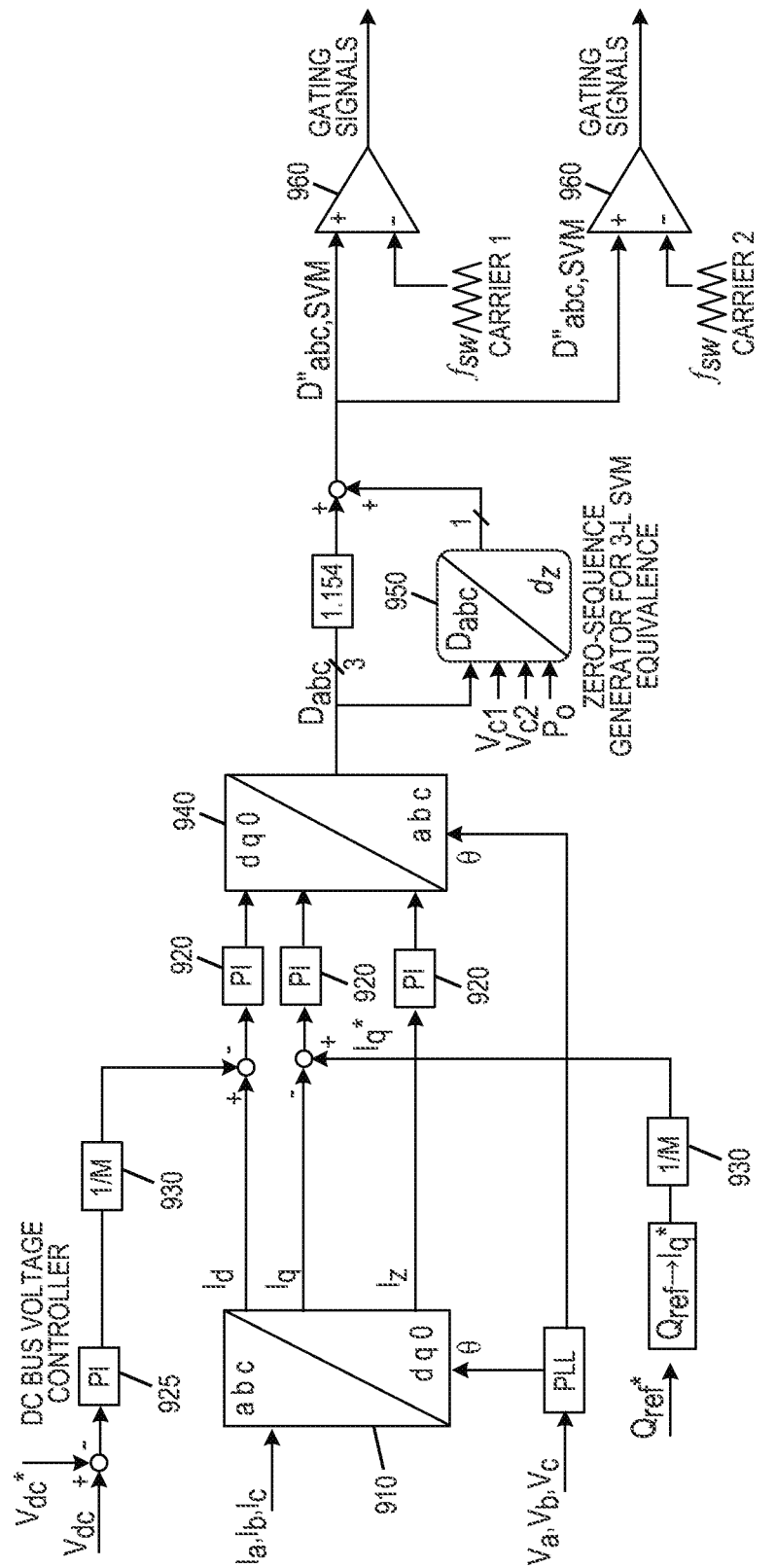
FIG. 9 illustrates an example control circuit, according to some embodiments of the present invention.

FIG. 9 illustrates an example control circuit 900 for controlling a single one of the M converter subcircuits 110 in FIG. 1 or one of the three subcircuits 210 in FIG. 2. As discussed in further detail below, the illustrated control circuit includes a closed-loop zero-sequence controller subcircuit that substantially eliminates circulating currents among the modules—this closed-loop zero-sequence controller can be omitted from the control circuit for one of the M converter subcircuits in the power converter (e.g., from one of the three subcircuits 210 in the circuit shown in FIG. 2). "Substantially" eliminating circulating currents means that circulating currents are eliminated for all practical purposes, although incidental ripple and short-term currents might be observable. For interleaved control of the M converter subcircuits, the switching carriers, shown as "Carrier 1" and "Carrier 2" in FIG. 9, should be phase-shifted from one converter subcircuit to the next, e.g., by an angle of 360°/M.

The control circuit 900 illustrated in FIG. 9 utilizes proportional-integral (PI) controllers operating in the dq0 synchronous reference frame. The modulation method is based on a multi-phase carrier-based pulse width modulation (PWM) equivalent to space vector modulation (SVM) technique. The generation of a carrier-based SVM-equivalent modulator for a three-level NPC converter is described in detail by Burgos, R. Lai, Y. Pei, F. Wang, D. Boroyevich, and J. Pou, "Space vector modulator for Vienna-type rectifiers based on the equivalence between two- and three-level converters: A carrier-based implementation," *IEEE Trans. Power Electron.*, vol. 23, no. 4, pp. 1888-1898, July 2008 (hereinafter referred to as the "Burgos article"). This technique, or a similar technique, can be adapted to converters having more than three levels; here it has been modified for handling bidirectional power flow and for handling multiple converters in parallel.

As shown in FIG. 9, the currents Ia, Ib, Ic of each converter module (see FIG. 2) are monitored, as are the input voltages Va, Vb, and Vc and the DC bus voltage Vd. Representations of Ia, Ib, Ic are converted to dq0 components Id, Iq, Iz in reference frame converter 910. Id and Iq, corresponding to the real and reactive components of the converter subcircuit currents, are compared to reference signals derived from the reference bus voltage Vdc* and a reactive power factor reference Qref*, and pass thru PI controllers 920. Iz is supplied directly to a PI controller 920. It will be appreciated that the reference for this closed-loop zero-sequence controller is zero in order to eliminate the circulating currents.

The reference for the current component Id is obtained from the output of a DC bus voltage controller 925, which works on an error voltage obtained by subtracting the reference voltage Vdc* from the measured voltage Vdc. The output of the controller 925 is scaled by a factor that depends on the numbers of converters in parallel, i.e., by 1/M. The reference for the current component Iq is obtained by converting the reactive power reference Qref* to a reactive current reference Iq*, and then scaling Iq* by the inverse of the number of converters in parallel, i.e., by dividing by M. The reference for the current component Iz is zero.

The outputs of the dq0 controllers 920 are converted back to the abc frame (Da, Db, Dc), with reference frame converter 940 and amplified by a scaling factor of 1.154, in order to achieve a maximum converter gain of the fundamental component equal to 1 (one). The resulting scaled signals are added to the zero-sequence duty cycle dz produced by zero-sequence generator 950. This is necessary to generate the SVM equivalence, by guaranteeing the equal distribution of the zero-states. The scaled signals D"a,b,c are then compared to switching carriers (Carrier 1 and Carrier 2), at comparators to generate gating signals to be applied to the switching elements of the power converter subcircuit.

Figure 10:
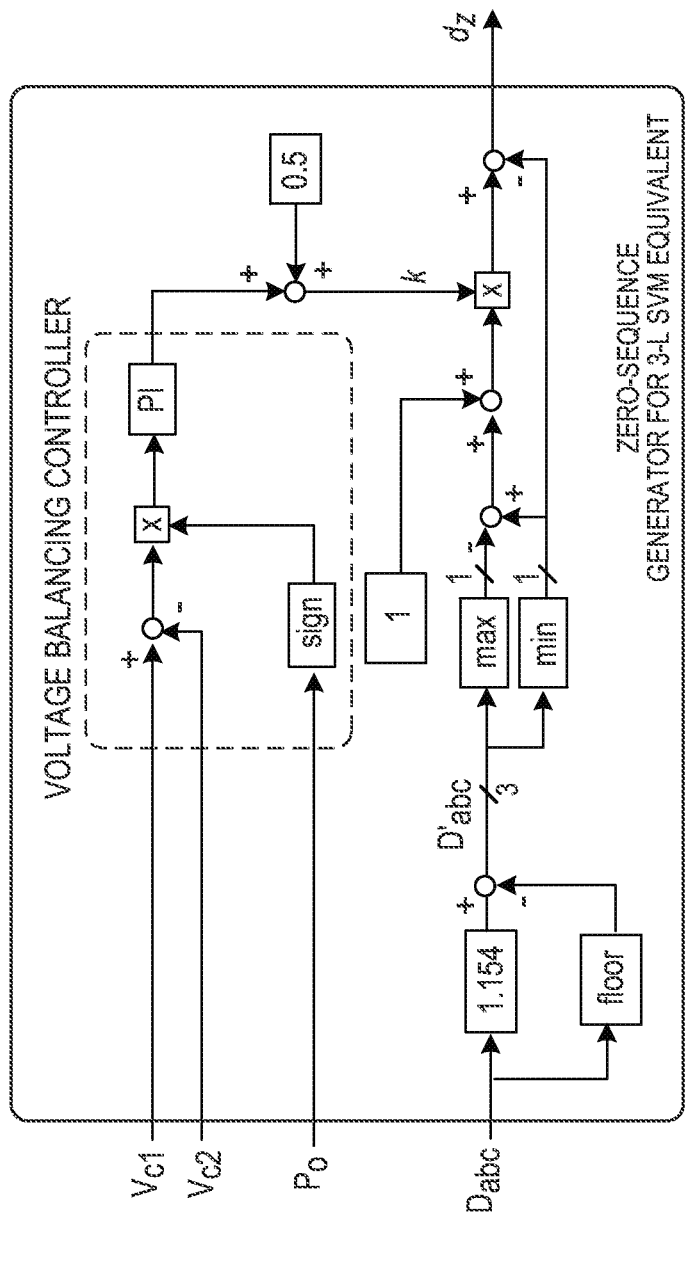
FIG. 10 illustrates details of an example zero-sequence generator circuit.

Details of the zero-sequence generator circuit 950, which calculates the zero-sequence duty cycle dz, are shown in FIG. 10. The abc duty cycles Da, Db, Dc are amplified by 1.154 and then a "floor" of the non-amplified duty cycles (i.e., the results of rounding down Da, Db, Dc to the nearest integers) is subtracted from the amplified duty cycles to generate a set of modified duty cycles Da', Db', Dc'. The range of these modified duty cycles is thus [−0.154, 1.154]. The max and min of these modified duty cycles are calculated and an arithmetic operation is performed as depicted in FIG. 10. Note that this expression is similar to what is described in the Burgos article referenced above, but with the exception that it is not necessary to define a different set of equations to define dz for duty cycles (Da, Db, Dc) range >0.866 and <−0.086, as described in the Burgos article. The formulation depicted in FIG. 10 is adequate for values of duty cycles Da, Db, Dc between [−1,1].

In addition, the value k responsible for the distribution of the zero-states is modified by the output of the DC bus voltage balancing controller, which forces the voltages Vc1 and Vc2 from the split capacitor bank to be equal. Assuming identical converter subcircuits and identical control operation, the value k should ideally be 0.5 for equal distribution of the zero-states among the power converter subcircuits. However it is modified around 0.5 by the output of the DC voltage balancing controller, as shown in FIG. 10. This method will ensure balanced operation of the split capacitor bank and avoid any drifting. Lastly, the logic of the DC bus voltage balancing controller is modified by changing the sign of the input error according to the direction of the power flow. This is based on a variable Po, which indicates whether the power flow is to or from the DC side; the sign of this variable is used to adjust the polarity of the voltage balancing controller. If the power flows from the AC to the DC side, the error should be positive when Vc1>Vc2, conversely if the power flows from the DC to the AC side, the error should be negative when the Vc1>Vc2.

With the zero-sequence generator circuit 950 shown in FIG. 9, multiple NPC converters can be controlled in parallel, while maintaining the zero-sequence (circulating) current near zero and keeping the DC bus voltage balanced for bidirectional power flow.

It should be understood that the present invention is not limited to the particular circuit configurations illustrated in FIGS. 2, 3, 9, and 10. Instead, these configurations should be understood to be examples of the power converters and corresponding control circuits, where the power converters include two or more multi-phase, bi-directional, multi-level, AC-DC, switching converter subcircuits, connected in parallel at respective AC and DC sides, so as to provide a multi-channel, bi-directional, multi-level configuration. While several of the pictured converter circuits include several multi-level, neutral-point-clamped converters, for example, other subcircuit topologies may be used instead, such as the active neural-point-clamped topology, topologies using flying capacitors, etc.

Even given a particular topology for the converter subcircuits, several variations of the illustrated circuits are possible. For example, the converter subcircuits may be realized using IGCTs, MV SiC IGBTs, MV SiC MOSFETs, GaN devices, or LV Si MOSFETs, in various embodiments.

Figure 11:
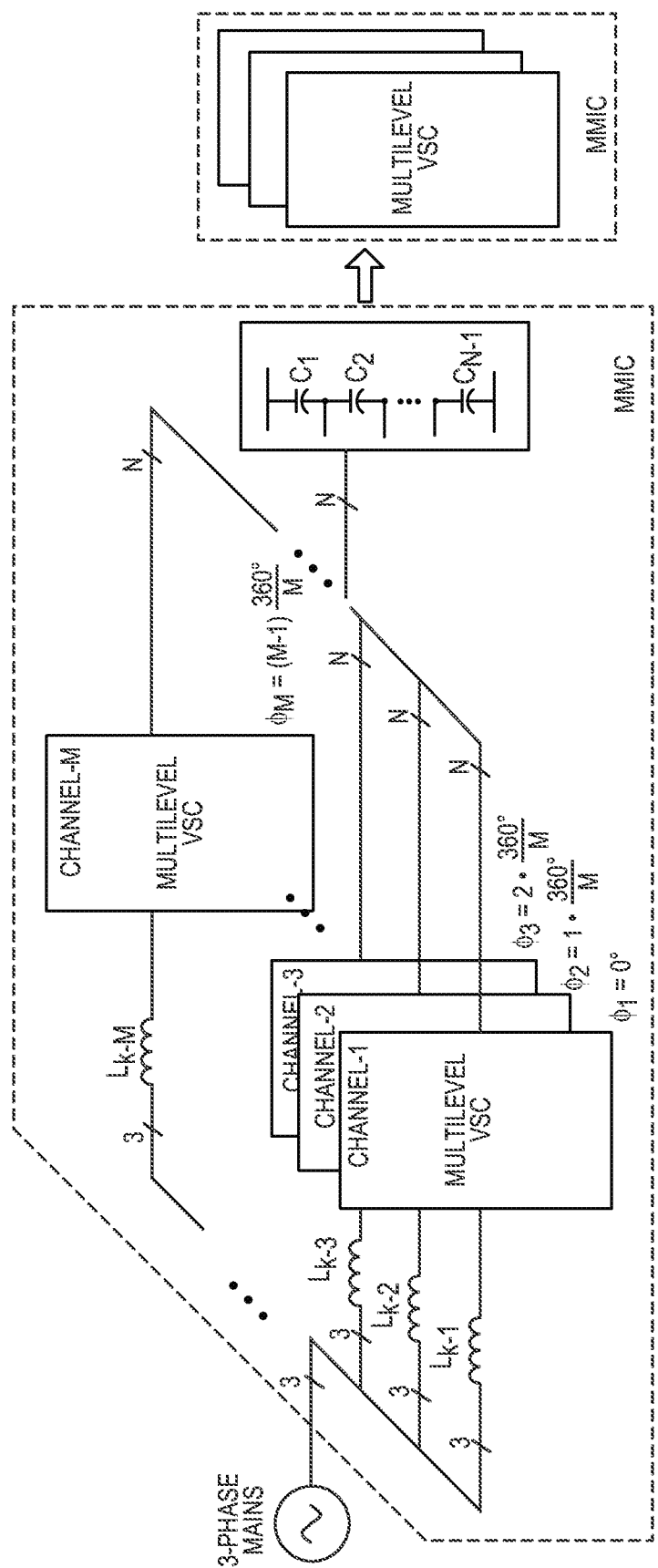
FIG. 11 illustrates a multi-channel, multi-level, interleaved converter (MMIC).
Figure 12:
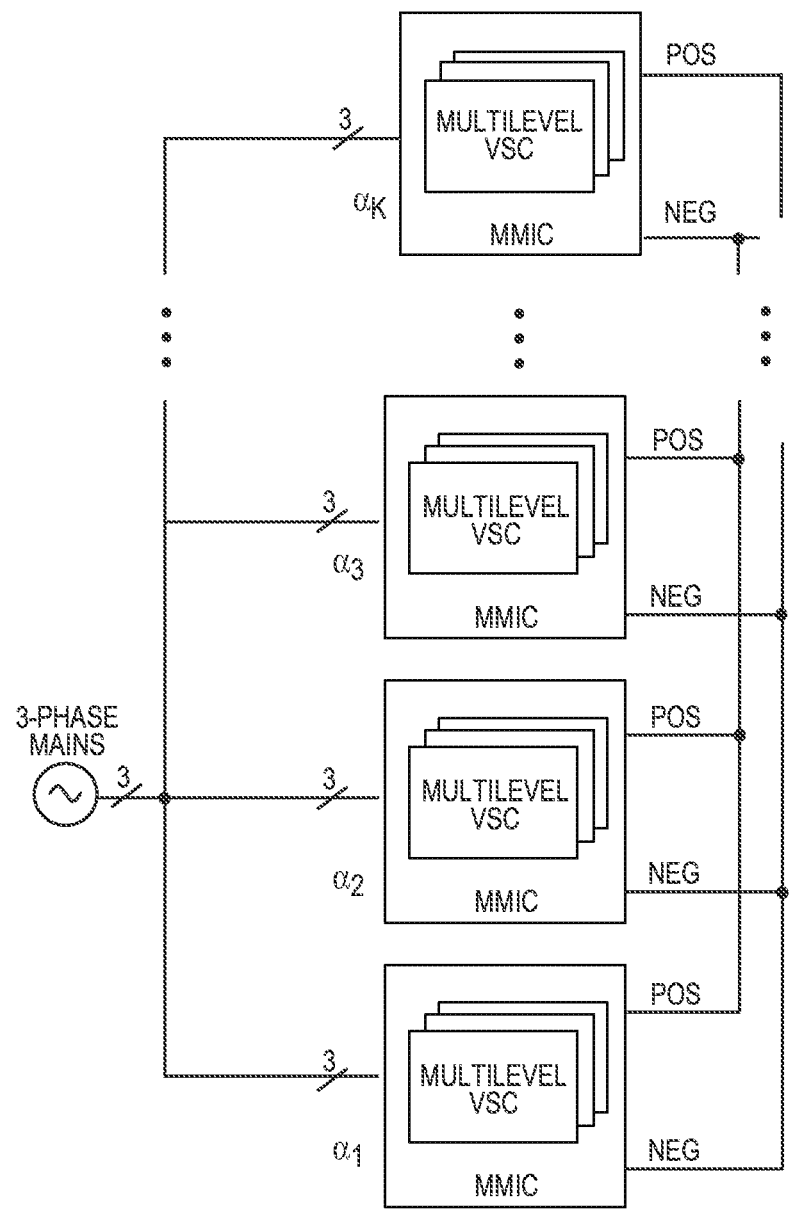
FIG. 12 illustrates a modular, multi-channel, multi-level, interleaved converter (MMMIC or M³IC), comprising multiple ones of the MMIC cells shown in FIG. 11.

Further, the illustrated circuits can be extended to provide further levels of parallelism. Thus, for example, a multi-channel, multi-level, interleaved converter (MMIC) can be developed as a basic cell, as shown in FIG. 11. As shown in FIG. 12, this cell can be connected in parallel with other identical cells, thus producing a modular, multi-channel, multi-level, interleaved converter (MMMIC or M3IC). In some of these configurations, an offset α may be applied to the interleaving angles between the modules.

Figure 13:
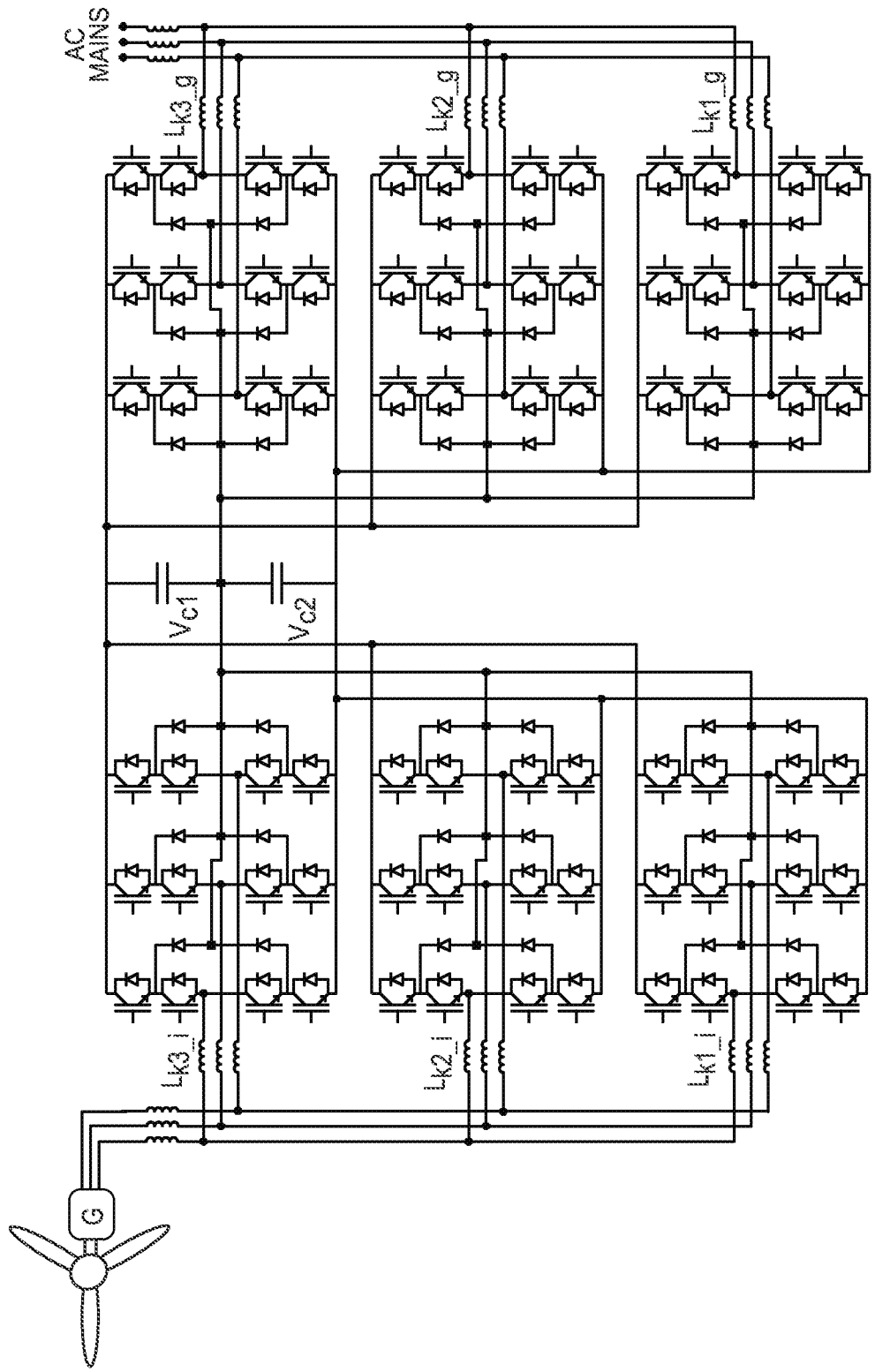
FIG. 13 shows a three-phase, multi-channel, back-to-back, AC-DC/DC-AC, three-level interleaved converter.

Another extension of the disclosed embodiments is to use two of the disclosed AC-DC converter circuits to realize a back-to-back, multi-phase AC-to-AC converter with bidirectional power flow control and a multi-channel, multi-level, interleaved structure. An example of this embodiment of the present invention is shown in FIG. 13, where two of the converter circuits 200 shown in FIG. 2 are connected in a back-to-back arrangement to form a three-channel, three-level, three-phase, AC-AC converter connected between a wind generator and an AC grid.

Several advantages of various embodiments of the circuits and techniques disclosed herein lie on the ability of the converter structure to reach higher current ratings and higher bandwidth than traditional grid tie converters, while maintaining high efficiency. The multi-channel, multi-level interleaved approaches described here can be used to provide a power electronics converter featuring higher power density than conventional approaches, enabling the utilization of these structures in areas where footprint and weight are of great concern. The topology will enable reduced weight and size by reducing the size of its AC linkage reactors, AC filter and DC bus capacitor.

In general, high-current converters are limited by the thermal limits of each semiconductor, which in turn limit its switching speed capabilities. Typically, high-current semiconductor devices operate at switching frequencies below 1 kHz, which necessitates the use of large AC linkage reactors. To maintain high efficiency, high-current converters must operate at low switching frequencies, and usually use pre-programmed switching patterns that limit their dynamic response. The circuits described herein allow higher current levels to be reached without a significant increase in the size of the AC reactors, while also maintaining high efficiency and improving the dynamic response. The AC linkage reactor sizes and AC filter are reduced as a result of the increased effective carrier frequency seen at the AC side, while the DC bus capacitor can be reduced as a result of the reduction in DC capacitor current ripple obtained by interleaving.

Since the net AC current ripple in the described circuits will be smaller and its frequency will be larger (M times the per-subcircuit switching frequency), the corner frequency of a filter necessary to eliminate the switching frequency can be located at a much larger value, therefore allowing the reduction of the size of its inductor or capacitor. At the same time, better performance as far as electromagnetic interference will be easier to attain. In grid-tie applications, where bulky and costly AC filters and reactors are typically needed, compliance with the harmonic requirements imposed by standards such as IEEE 519 and WC 61000 can be achieved while using much smaller AC filters and reactors. In summary, the circuits disclosed herein will allow reaching higher current levels, while maintaining high efficiency and increasing the bandwidth of high-power converters.

Several inventive techniques and circuits have been disclosed above. It will be appreciated that these techniques and circuits may be combined with one another, depending on the application requirements. With the above-described circuits, systems, methods, and other variations and extensions in mind, those skilled in the art will appreciate that the foregoing description and the accompanying drawings represent non-limiting examples of the systems and apparatus taught herein. Accordingly, the present invention is not limited by the foregoing description and accompanying drawings. Particular embodiments of the invention are described by the following claims.

What is claimed is:

1. A multi-phase power converter, comprising:
two or more multi-phase, bi-directional, multi-level, switching power converter subcircuits, connected in parallel at respective AC and DC sides, so as to provide a multi-channel, bi-directional, multi-level configuration; and
a control circuit configured to calculate a set of duty cycles using a first output of a closed-loop zero-sequence component controller configured to substantially eliminate circulating current among the switching converter subcircuits, the control circuit including a zero-sequence generator configured to calculate a zero-sequence duty cycle, the control circuit being configured to selectively control one or more switching semiconductor devices in each of the switching converter subcircuits using a set of modified duty cycles based on the zero-sequence duty cycle and the set of duty cycles;
wherein calculating the zero-sequence duty cycle includes calculating a difference between a first voltage of a common split-capacitor bank and a second voltage of the common-split capacitor bank, updating a sign of the difference based on a power variable corresponding to a direction of power flow through the multi-phase power converter, and generating a second output with a proportional-integral controller of the zero-sequence generator using the updated difference,
wherein the AC sides of the switching converter subcircuits are directly coupled to one another and to a multi-phase AC input via series interface reactors, and wherein the DC sides of the switching converter subcircuits are directly connected to one another and to the common split-capacitor bank at each level of multi-level outputs of the switching converter subcircuits, and
wherein the multi-level configuration includes an output voltage synthesized or an input voltage sourced from three or more voltage levels of the common split-capacitor bank.

2. The power converter of claim 1, wherein the control is configured to control the switching semiconductor devices so that corresponding switching semiconductors in each of the switching converter subcircuits are switched in an interleaved manner.

3. The power converter of claim 1, wherein the series interface reactors comprise multi-phase coupled inductors.

4. The power converter of claim 1, wherein each of the switching converter subcircuits comprises a multi-level, neutral-point-clamped, power converter circuit.

5. The power converter of claim 1, wherein each of the switching converter subcircuits comprises a 3 level, power converter circuit.

6. The power converter of claim 1, wherein the control circuit comprises controller circuits configured to control the active and reactive power flow of each of the switching converter subcircuits using d-axis reference voltages, respectively, of a synchronous reference frame of a reference frequency, and wherein the zero-sequence generator is configured to realize Space Vector Modulation equivalence and to balance voltages across levels of the common split-capacitor bank.

7. The power converter of claim 1, wherein each of the switching converter subcircuits is included in a separate, self-contained module.

8. A power conversion system comprising:
an AC side;
a DC side; and
a multi-phase power converter coupled between the AC side and the DC side, the converter including:
two or more multi-phase, multi-level, switching power converter subcircuits, connected in parallel between the AC side and DC side, so as to provide a multi-channel, multi-level configuration structured to selectively transmit a current from the AC side to the DC side and from the DC side to the AC side; and
a control circuit configured to calculate a set of duty cycles using a first output of a closed-loop zero-sequence component controller configured to substantially eliminate circulating current among the switching converter subcircuits, the control circuit including a zero-sequence generator configured to calculate a zero-sequence duty cycle, the control circuit being configured to selectively control one or more switching semiconductor devices in each of the switching converter subcircuits using a set of modified duty cycles based on the zero-sequence duty cycle and the set of duty cycles;
wherein calculating the zero-sequence duty cycle includes calculating a difference between a first voltage of a common split-capacitor bank and a second voltage of the common-split capacitor bank, updating a sign of the difference based on a power variable corresponding to a direction of power flow through the multi-phase power converter, and generating a second output with a proportional-integral controller of the zero-sequence generator using the updated difference,
wherein the AC sides of the switching converter subcircuits are directly coupled to one another and to a multi-phase AC input via series interface reactors, and wherein the DC sides of the switching converter subcircuits are directly connected to one another and to the common split-capacitor bank at each level of multi-level outputs of the switching converter subcircuits.

9. The power system of claim 8, wherein the control is configured to control the switching semiconductor devices so that corresponding switching semiconductors in each of the switching converter subcircuits are switched in an interleaved manner.

10. The power system of claim 8, wherein the series interface reactors comprise multi-phase coupled inductors.

11. The power system of claim 8, wherein each power converter subcircuit is structured to receive or transmit three or more voltage levels on the DC side.

12. The power system of claim 8, wherein each of the switching converter subcircuits comprises a multi-level, neutral-point-clamped, power converter circuit.

13. The power system of claim 8, wherein the control circuit comprises controller circuits configured to control the active and reactive power flow of each of the switching converter subcircuits using d-axis reference voltages, respectively, of a synchronous reference frame of a reference frequency, and wherein the zero-sequence generator is configured to realize Space Vector Modulation equivalence and to balance voltages across levels of the common split-capacitor bank.

14. The power system of claim 8, wherein each of the switching converter subcircuits is included in a separate, self-contained module.

15. The power system of claim 8 wherein the scaling factor is an inverse of the number of the switching power converter subcircuits.

* * * * *